United States Patent [19]

Denman, Jr. et al.

[11] Patent Number: 4,893,268
[45] Date of Patent: Jan. 9, 1990

[54] CIRCUIT AND METHOD FOR ACCUMULATING PARTIAL PRODUCTS OF A SINGLE, DOUBLE OR MIXED PRECISION MULTIPLICATION

[75] Inventors: Marvin A. Denman, Jr.; John M. Young, both of Austin; Mitch K. Alsup, Dripping Springs, all of Tex.

[73] Assignee: Motorola, Inc., Schaumburg, Ill.

[21] Appl. No.: 181,865

[22] Filed: Apr. 15, 1988

[51] Int. Cl.$^4$ .............................................. G06F 7/52
[52] U.S. Cl. .................................................. 364/759
[58] Field of Search ................. 364/750.5, 748, 754, 364/757–760, 749, 768

[56] References Cited

U.S. PATENT DOCUMENTS

| | | | |
|---|---|---|---|
| 3,569,685 | 3/1971 | Chesley | 364/749 |
| 4,484,301 | 11/1984 | Borgerding et al. | 364/760 |
| 4,722,068 | 1/1988 | Kuroda et al. | 364/757 |
| 4,754,421 | 6/1988 | Bosshart | 364/757 |

FOREIGN PATENT DOCUMENTS 0132646 2/1985 European Pat. Off. ............ 364/754

Primary Examiner—David L. Clark
Assistant Examiner—Dale M. Shaw
Attorney, Agent, or Firm—Robert L. King

[57] ABSTRACT

A circuit for use in conjunction with a multiplier receives a portion of completed product bits and a portion of sum and carry bits which, when accumulated, provide a complete output product operand. The circuit is adaptable for use with input operands having single or double precision data formats. The accumulation time required depends upon which data format mode the circuit is operating in.

7 Claims, 3 Drawing Sheets

CIRCUIT AND METHOD FOR ACCUMULATING PARTIAL PRODUCTS OF A SINGLE, DOUBLE OR MIXED PRECISION MULTIPLICATION

FIELD OF THE INVENTION

This invention relates generally to arithmetic circuits, and more particularly, to digital arithemetic circuits which accumulate a plurality of operands.

BACKGROUND OF THE INVENTION

Two common operand formats as established by IEEE are known as single precision data and double precision data formats. As established by the IEEE P754 binary floating point arithmetic standard, single precision floating point data comprises a mantissa portion, an exponent portion and a sign bit portion. The mantissa portion represents a fraction F and is defined as comprising twenty-three bits plus an implied "1" bit for a total of twenty-four mantissa bits. The mantissa is thus represented as a value "1.F". The exponential portion in the single precision format comprises eight bits. Double precision floating point data also comprises a mantissa portion, an exponent portion and a sign bit portion. The mantissa portion of double precision data is defined as comprising fifty-two bits plus an implied "1" bit for a total of fifty-three bits. The exponential portion comprises eleven bits. Both data formats have a single bit for the sign bit.

Since both data formats are in common usage, processors must be able to operate with either format interchangeably. An example of a multiplier which is capable of multiplying both fixed point and floating point operands is disclosed in U.S. Pat. No. 4,594,679 by George et al. entitled "High Speed Hardware Multiplier For Fixed Floating Point Operands". For operands of thirty-two bits or more, previous multiplier/accumulator circuits require many machine clock cycles to accumulate a final product result.

BRIEF DESCRIPTION OF THE INVENTION

Accordingly, it is an object of the present invention to provide an improved circuit for accumulating partial products of a multiplication of operands having mixed precision formats.

It is another object of the present invention to provide an improved method for accumulating partial products of a multiplication of operands having mixed precision formats.

In carrying out these and other objects of the invention, there is provided, in one form, an apparatus for forming and selectively combining one or more partial product operands resulting from two input operands multiplied by a multiplier. When more than one partial product operand is formed, the partial product operands are accumulated to provide a completed output product result operand. Each input operand has either a single, or double precision data format. A first adder portion selectively receives unaccumulated sum and carry bits resulting from the multiplication of the two input operands and received previously accumulated product bits of a first predetermined portion of the output product operand. The first adder portion adds the received bits to provide a lower predetermined portion of the output product operand. A second adder portion selectively receives a predetermined portion of the unaccumulated sum and carry bits resulting from the multiplication of the two input operands and receives previously accumulated product bits of a second predetermined portion of the output product operand. The second adder portion adds the received bits to provide an upper predetermined portion of the output product operand. A latch is coupled to the first and second adder portions for receiving and storing the lower and upper portions of the output product operand. Feedback is provided between the latch and the first and second adder portions for selectively providing the first and second portions of the previously accumulated product bits.

These and other objects, features and advantages will be more clearly understood from the following detailed description taken in conjunction with the accompanying drawings.

DETAILED DESCRIPTION OF THE INVENTION

Figure 1:
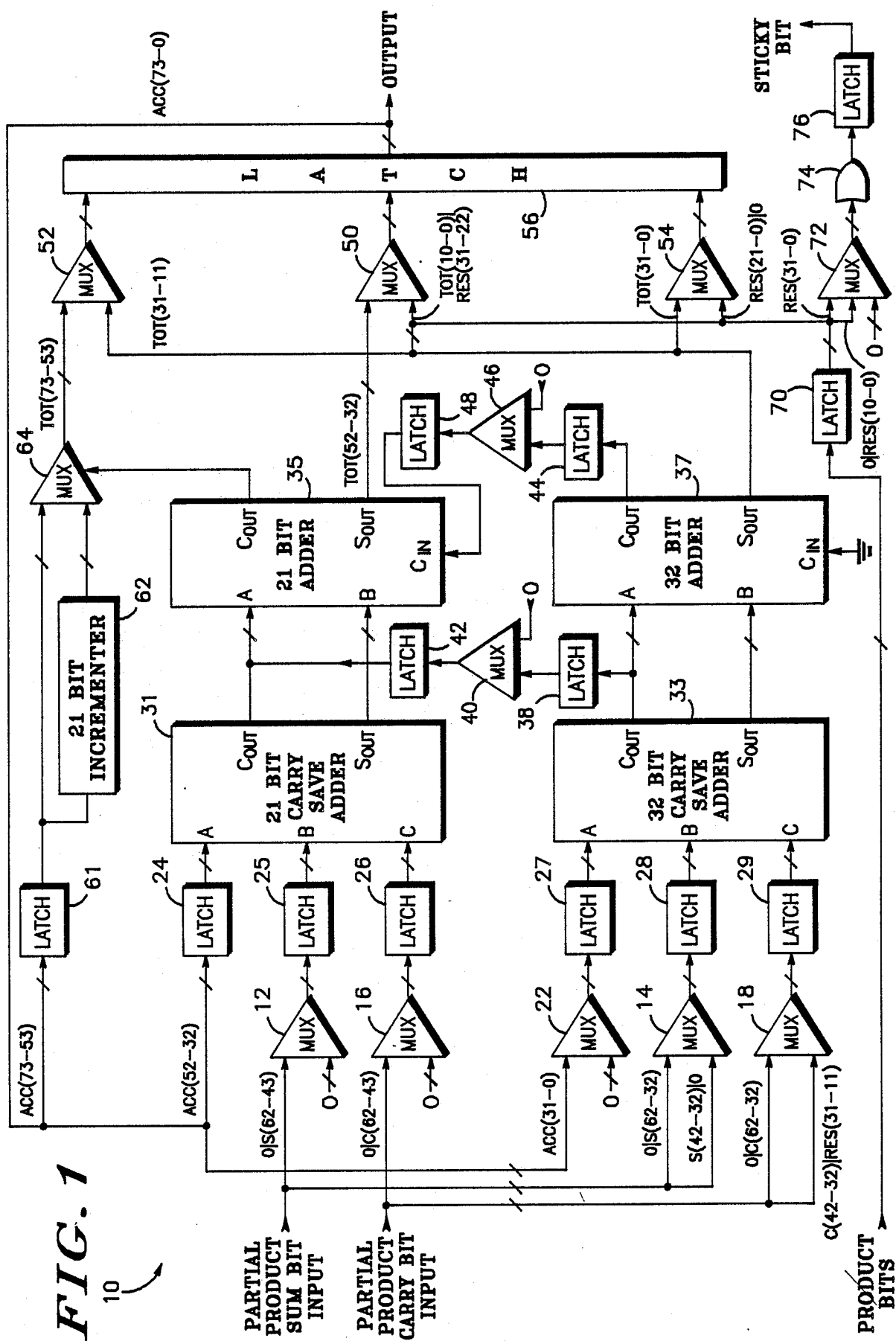
FIG. 1 illustrates in block diagram form a circuit for accumulating partial product operands in accordance with the present invention.

Shown in FIG. 1 is an accumulator circuit 10 which functions to accumulate or add the partial product operands of the multiplication of two operands which each may be in single or double precision format. It should be well understood that the present invention may be used in connection with a variety of different types of multiplier circuits.

Accumulator circuit 10 receives a predetermined plurality of partial product sum input bits, a predetermined plurality of partial product carry input bits, and a predetermined plurality of product input bits. The partial product sum input bits are coupled to a first input of a multiplexor circuit 12 and to both first and second inputs of a multiplexor circuit 14. The partial product carry bit inputs are coupled to a first input of a multiplexor circuit 16 and to both first and second inputs of a multiplexor circuit 18. A multiplexor 22 is provided having first and second inputs. A plurality of logic zero bits is connected to a second input of multiplexors 12 and 16 and to the second input of multiplexor 22. A latch 24 is provided having an input and an output. An output of multiplexor 12 is connected to an input of a latch 25, and an output of multiplexor 16 is connected to an input of a latch 26. An output of multiplexor 22 is connected to an input of a latch 27. An output of multiplexor 14 is connected to an input of a latch 28, and an output of multiplexor 18 is connected to an input of a latch 29. Latches 24–29 are conventional pipelined latch circuits. An output of latch 24 is connected to a first input, labeled "A", of a carry save adder 31. An output of latch 25 is connected to a second input, labeled "B", of carry save adder 31, and an output of latch 26 is connected to a third input, labeled "C", of carry save adder 31. An output of latch 27 is connected to a first input labeled "A" of a carry save adder 33. An output of latch 28 is connected to a second input labeled "B" of carry save adder 33, and an output of latch 29 is connected to a third input, labeled "C", of carry save adder 33. A carry output, labeled $C_{out}$, of carry save adder 31 is connected to a first operand input terminal, labeled "A", of an adder 35. The connection logically shifts the carry output of adder 31 to the left by one digit. A sum output, labeled $S_{out}$, of adder 31 is connected to a second operand input terminal, labeled "B", of adder 35. A carry output, labeled $C_{out}$, of carry save adder 33 is logically shifted left by one and connected to a carry input terminal, also labeled "A", of a thirty-two bit adder 37 with the MSB also connected to an input of a latch 38. A sum output, labeled $S_{out}$, of adder 33 is connected to a second operand input terminal, labeled "B", of adder 37. A carry bit input terminal of adder 37 labeled "$C_{in}$" is connected to a ground reference voltage representing a logic zero value. An output of latch 38 is connected to a first input of a multiplexor circuit 40. A second input of multiplexor circuit 40 is connected to a logic zero bit value. An output of multiplexor circuit 40 is connected to an input of a latch 42. An output of latch 42 is connected to the LSB carry operand input terminal labeled "A" of adder 35. A carry output, labeled $C_{out}$, of adder circuit 37 is connected to an input of a latch 44. An output of latch 44 is connected to a first input of a multiplexor 46. A second input of multiplexor 46 is connected to a logic zero bit value. An output of multiplexor 46 is connected to an input of a latch 48. An output of latch 48 is connected to a carry bit input terminal labeled "Cin" of adder 35. A sum output terminal, labeled $S_{out}$, of adder 35 is connected to a first input of a multiplexor 50. A sum output terminal, also labeled $S_{out}$, of adder 37 is connected to a second input of a multiplexor 52, to a first input of a multiplexor 54 and to a second input of multiplexor 50. An output of each of multiplexors 52, 50 and 54 is respectively coupled to a first, a second and a third input of an output latch 56. The output of output latch 56 provides an accumulated output signal. The output of output latch 56 is also connected to a first input of multiplexor 22, to the input of latch 24 and to an input of a latch 61. An output of latch 61 is connected to both an input of an incrementer circuit 62 and to a first input of a multiplexor 64. An output of incrementer 62 is connected to a second input of multiplexor 64. A carry output terminal, labeled $C_{out}$, of adder 35 is connected to a control input terminal of multiplexor 64. An output of multiplexor 64 is connected to a first input of multiplexor 52.

The input product bits are coupled to an input of a latch 70. An output of latch 70 is connected to a first and a second input of a multiplexor 72, to a second input of multiplexor 54 and to the second input of multiplexor 50. A plurality of logic zero bits is connected to a third input of multiplexor 72. An output of multiplexor 72 is connected to an input of an OR gate 74. An output of OR gate 74 is connected to an input of a latch 76. An output of latch 76 provides a sticky bit output.

In operation, accumulator 10 functions to provide an output which is an accumulation of two or more partial product operands resulting from the multiplication of two input operands. The input operands may be of single precision, double precision or mixed precision (i.e. one operand being single precision and the other being double precision). Although accumulator 10 is illustrated with individual multiplexors and adders having specific bit size parameters, it should be well understood that the named operand formats may be supported by the present invention when implemented by multiplexors and adders having bit size capacities other than the specific sizes illustrated. Further, the present invention may be implemented with numerous variations to accumulator 10 including other types of adders than the types illustrated in accumulator 10.

Figure 2A:
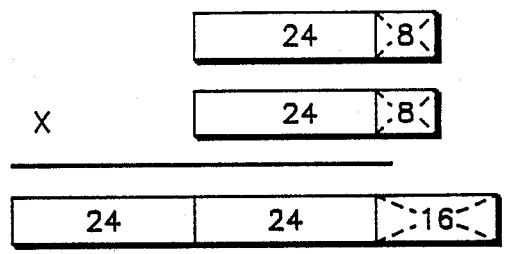
FIGS. 2(A)–(C) diagrammatically illustrate the multiplication and accumulation which the circuit of FIG. 1 provides.

Referring to FIG. 2(A), a multiplication of two single precision operands is illustrated in block diagram form. Each single precision operand is twenty-four bits long as established by the IEEE P754 standard. Since data buses for most processors are thirty-two bits wide, an additional eight bits of logic zeroes are inserted at the end of each operand as denoted in FIG. 2(A). Therefore, two thirty-two bit operands may be inputted to a multiplier (not shown) via a conventional data bus. Since each operand intentionally contains eight logic zeroes, the product is guaranteed to have sixteen bits of logic zeroes in the sixteen LSBs as noted in the output product of FIG. 2(A). The product of two twenty-four bit input operands is a forty-eight bit result with two bits to the left of the decimal point. The forty-eight bits are aligned to be the forty-eight MSBs of the seventy-four bit output capacity of output latch 56.

In operation, the accumulation of partial product operands of the multiplication of two single precision operands only takes one machine cycle. For purposes of discussion herein, a machine cycle is to be understood as an amount of time between successive loading of bits by latch 56. Accumulator 10 receives thirty-two bits which are the lower completed product result bits (Res 31-0) of the multiplication including sixteen guaranteed logic zeroes. Accumulator 10 also receives thirty-one carry and thirty-one sum bits which are the upper sum and carry bits of the multiplication. A leading zero in the MSB position precedes each of the two groups of thirty-one carry and sum bits because adder 33 is a thirty-two input bit adder and the additional bit is needed to properly load adder 33. The lower thirty-two product result bits are coupled to latch 70 and to multiplexors 54 and 50. In a single machine cycle, carry save adder 33 and adder 37 accumulate the inputted carry and sum input bits to provide a fully resolved thirty-two bit output, Tot(31-0). If accumulator 10 only supported single precision operands, adder 37 need not be implemented as only adder 33 is necessary. However, as described below, both adders are required when other precisions are used. Multiplexor 54 provides a thirty-two bit output and outputs result bits 21 thru 0 followed by ten trailing logic zeroes to latch 56 for storage for the lower LSBs of latch 56. Multiplexor 50 provides a twenty-one bit output and outputs the lowest eleven bits [Tot(10-0)] of the accumulated higher order input sum and carry bits and result bits 31-22, RES(31-22), to latch 56 for storage wherein the bits [Tot(10-0)] are the most signifcant bits outputted. Multiplexor 52 also provides a twenty-one bit output and outputs the highest twenty-one bits [Tot(31-11)] of the accumulated higher order input sum and carry bits to latch 56 for storage. Control circuitry (not shown) may be provided to control multiplexors 14, 18 and 22 so that multiplexor 22 outputs a zero value, multiplexor 14 outputs the input sum bits 32-62 and multiplexor 18 outputs the input carry bits 32-62. The outputs of multiplexors 12 and latch 24 are irrelevant during this portion of operation. The upper sum and carry input bits are added together by carry save adder 33 and adder 37. The output sum bits of adder 37 are the total output bits (Tot). Control circuitry also enables multiplexor 72 to output the logic zero operand which is coupled to the input of OR gate 74. Therefore, a sticky bit of logic zero is outputted by latch 76 to indicate an absence of sticky bit information.

Latch 56 provides a seventy-four bit output regardless of the input operand format. Seventy-four bits are chosen to properly support the multiplication of two IEEE double precision operands. From FIG. 2(A) it is apparent that for a multiplication of two single precision operands, only forty-eight output bits are required. Regardless of the operand precision, the MSB of latch 56 is an overflow bit, and the second MSB is a hidden bit for floating point format. Therefore, the output provided by latch 56 always has a fixed binary point position between bit positions 71 and 72 in latch 56 regardless of the input operand precision format. The following bits are mantissa bits of the accumulated output. For single precision accumulation, bits 73 thru 26 of latch 56 are the forty-eight bits of the output of FIG. 2(A). All lower twenty-six bits Acc (25-0) of latch 56 are logic zero bits.

Figure 2B:
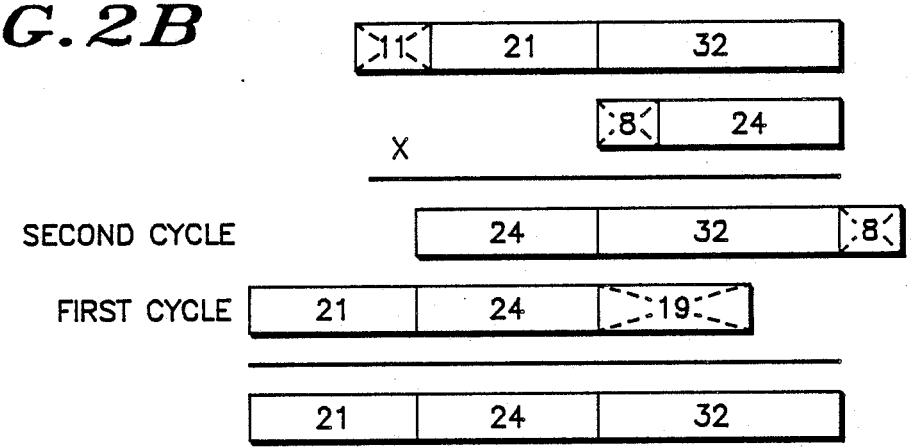

The multiplication of a single precision operand with a double precision operand, referred to herein as mixed precision multiplication, is illustrated in FIG. 2(B). The double precision operand has fifty-three bits which are divided into a thirty-two bit portion and a twenty-one bit portion accompanied by eleven additional lower bits of forced zeroes as noted by the dashed diagonal lines. Additional bits are inserted where needed to allow operands of less than thirty-two bits to be transmitted along conventional thirty-two bit data buses. For purposes of illustrating the double precision operand, eleven forced logic zero bits are illustrated in the MSB position in FIG. 2(B). However, when the partial product operands are formed, the added forced zeroes are inserted as LSBs. The single precision operand of FIG. 2(A) has an additional eight bits of zeroes which are added to insure that the single precision operand may be transmitted along a conventional thirty-two bit data bus. The accumulation of partial product operands resulting from the multiplication of mixed precision operands requires three machine cycles to complete.

In the first cycle, the lower thirty-two completed product bits Res(31-0) from a multiplier (not shown) are coupled to latch 70 of accumulator 10. The upper thirty-one sum and carry bits generated during the multiplication are respectively coupled to multiplexors 14 and 18. Control circuitry (not shown) controls multiplexors 14, 18 and 22 to allow multiplexor 22 to output a logic zero operand, to allow multiplexor 14 to output sum bits 62-32 with a single leading zero bit and to allow multiplexor 18 to output carry bits 62-32 with a single leading zero bit. The sum and carry bits are added by carry save adder 33 with a zero input for the "A" input. The two outputs of carry save adder 33 are connected to adder 37 which provides both a carry output bit which is latched by latch 44 and the completed or total output bits, Tot(31-0). The carry output bit of adder 37 is always guaranteed to be zero in the first machine cycle due to the zeroes which are inputted into adder 33. The total output bits are connected to multiplexors 50, 52 and 54. Control circuitry functions to output the bits Tot(31-11) from multiplexor 52, the bits Tot(10-0) and the product result bits Res(31-22) from multiplexor 50 and the product result bits Res(21-0) along with ten logic zero bits from multiplexor 54. During the first machine cycle, the second partial product operand which is illustrated in FIG. 2(B) is formed. The second partial product operand is the multiplication of the upper order portion of the double precision operand and the single precision operand. The upper twenty-one bits are provided by multiplexor 52. The twenty-one MSBs of the intermediate twenty-four bits are provided by multiplexor 50. However, only eleven of these bits are formed during the first cycle. The other ten bits of multiplexor 50 are comprised of the previously formed input product result bits Res(31-22). The three LSBs of the intermediate twenty-four bits of the second partial product operand formed during the first machine cycle are provided by multiplexor 54 and are a portion of the input result bits Res(21-19). During the first machine cycle, carry save adder 31 and adder 35 are not contributing to latch 56 and thus the outputs of multiplexors 12, 16 and 64 and latch 24 are not meaningful. Multiplexor 40 and 46 each output a logic zero to latches 42 and 48, respectively. Therefore, a logic zero carry input bit is coupled to adder 35 during the first machine cycle.

During a second machine cycle, the first partial product operand illustrated in FIG. 2(B) is formed. The first partial product operand is the result of the multiplication of the lower ordered portion of the double precision operand and the single precision operand. The first partial product operand must be properly aligned with the second partial product formed during the first machine cycle so that when added with the first partial product operand, the correct output will result. Multiplexor 18 couples input carry bits C(42-32) and the product result bits Res(31-11) to carry save adder 33. The least significant product result bits Res(10-8) are useful only for sticky bit information and are outputted by multiplexor 72. Sticky bit information is only collected during the second machine cycle. Product result bits Res (7-0) will always be a logic zero and will not affect the output. Multiplexor 14 couples sum bits S(42-32) and twenty-one forced logic zeroes to adder 33. Multiplexor 22 couples the low order accumulation bits Acc(31-0) from the previous machine cycle to carry save adder 33. Multiplexor 16 couples a leading zero and carry bits C(62-43) to adder 31. Multiplexor 12 couples a leading zero bit and sum bits S(62-43) to adder 31. Latch 24 couples the accumulation bits Acc(52-32) to adder 31. Accumulation bits Acc(73-53) are coupled to latch 61 from latch 56 as a sole input to incrementer 62.

Figure 3A:
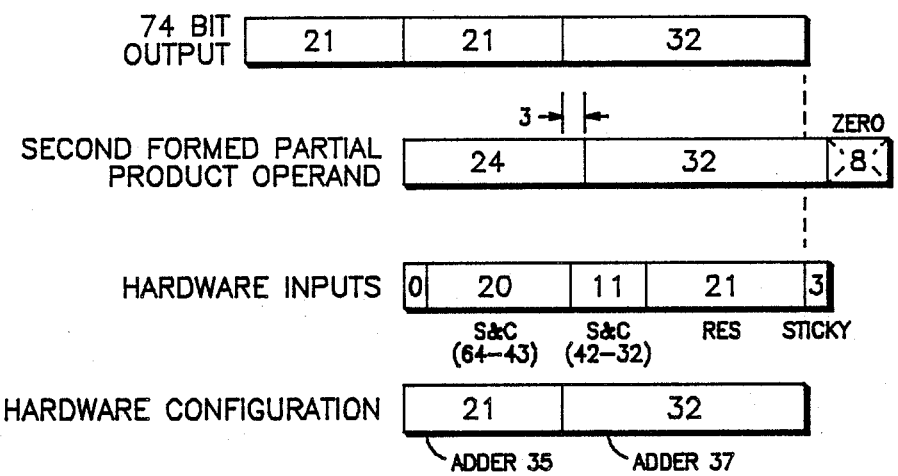
FIGS. 3(A) and (B) diagrammatically illustrate a bit alignment pattern for the circuit of FIG. 1.

Referring to FIG. 3(A), a correlation of bit alignments in accumulator 10 between the hardware inputs and the hardware configuration is provided. The second partial product operand formed during the second machine cycle is illustrated wherein the second partial product operand comprises a twenty-four bit portion and a thirty-two bit portion. The upper twenty-one bits of the second partial product operand are fully represented by the output of adder 35. The lower three bits of the twenty-four bit portion are contained as the three MSBs of adder 37. All of the remaining bits of the thirty-two bit portion except the three LSBs are outputted by adder 37 in bit locations 0-28. The lower three LSBs of the thirty-two bit portion are sticky information which is latched by latch 70. In order to properly line up the second partial product operand with the previous seventy-four bits of the first cycle, the input sum and carry bits are shifted up by twenty-one bits as shown in FIG. 3. This can be further seen by observing the total shifts of operands. The preferred path of input bits thru accumulator 10 is via the thirty-two bit carry save adder 33. These bits are then shifted forty-two bits upward into a seventy-four bit data path which is fed back to the inputs of accumulator 10. In order for new information to line up with the data path, a shift upward of twenty-one bits is required. This shifting makes full use of the thirty-two bit added 37 which is the most efficient operation for accumulator 10.

In the illustrated form, during the second machine cycle the second partial product operand is added with the first partial product operand. Multiplexor 54 provides the completed accumulated total bits Tot(31-0). Multiplexor 50 provides the completed accumulated total bits Tot(52-32). Latch 61 functions to couple the bits Acc(73-53) accumulated from the first machine cycle to incrementer 62 where the bits are incremented by an additional logic one. Multiplexor 64 either couples the incremented accumulated bits of the original accumulation bits Acc(73-53) which are outputted from latch 61 as new output bits Tot(73-53) in response to the logic state of the carry output bit of adder 35 from the first cycle of accumulation. A third machine cycle is needed to ensure that any output carry bit which is generated by either adder 33 or 37 during the second machine cycle is reflected into the upper output bits Tot(73-32). Therefore, the only change to the upper forty-two bits of latch 56 which may occur during the third machine cycle results from the carry outputs of latches 42 and 48. During the third machine cycle, latches 42 and 48 are updated to contain the carry information from the second machine cycle. The updated carry information is then used to form the bits Tot(73-32). The output of each of latches 27, 28 and 29 does not change during the third machine cycle. Control circuitry (not shown) which is coupled to multiplexors 12 and 16 forces multiplexors 12 and 16 to output a zero value operand whereas latch 24 continues to output the output bits Acc(52-32). The new accumulation bits Acc(73-32) provided during the second machine cycle are coupled back thru latches 24 and 61. Adder 35 adds the carry bit which is received from each of latches 42 and 48 to the previous accumulated result Acc(52-32). Bits Acc(73-53) are incremented in value by one by incrementer 62. If a carry output bit is created during the third machine cycle by adder 35, multiplexor 64 selects the incremented accumulation bits Acc(73-52) to couple to latch 56 which are then outputted as output bits Tot(73-52). If no carry output bit is created during the third machine cycle by adder 35, multiplexor 64 selects the previous accumulation bits Acc(73-52) from latch 61 to output as output bits Tot(73-52). It should be noted that carry save adder 33 and adder 37 function in combination in the above described mixed precision operand accumulation to translate from a three input adder structure to a two input adder which provides an output sum operand and a single carry output bit. The same statement applies to carry save adder 31 and adder 35. Latch 38, multiplexor 40 and latch 42 function to couple the output carry operand from carry save adder 33 to adder 35 during the second and third machine cycles. Latch 44, multiplexor 46 and latch 48 function to couple a single carry output bit from adder 37 during the second and third machine cycles into the upper bit locations being accumulated by adder 35.

Figure 2C:
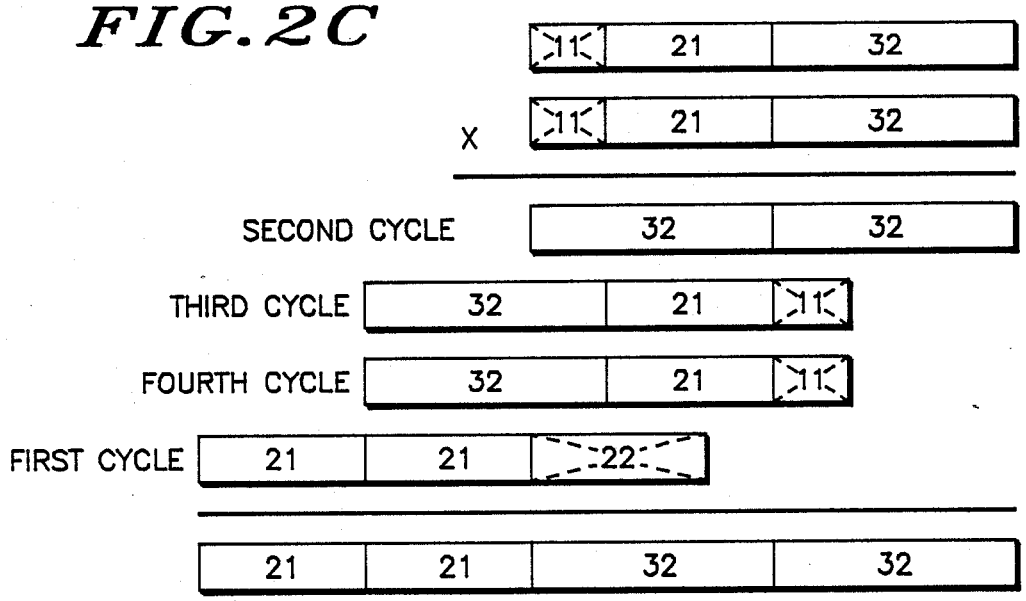

The multiplication of a double precision operand with a double precision operand is illustrated in FIG. 2(C). As in FIG. 2(B), the double precision operand has fifty-three bits which are divided into a thirty-two bit portion and a twenty-one bit portion accompanied by an additional eleven lower bits of forced zeroes as noted by the dashed diagonals. The additional lower bits are again provided to allow the twenty-one bit operand portions to be transmitted along conventional thirty-two bit data buses. Again for illustration purposes only, the eleven forced zeroes of each double precision operand are illustrated in the MSB position in FIG. 2(C). However, when the partial product operands are formed, the added forced zeroes are inserted as LSBs. The accumulation of double precision operands requires five machine cycles to complete.

In the first cycle, the high order portions of each input operand are multiplied. The lower thirty-two completed product bits Res(31-0) are provided by a multiplier (not shown) and are coupled to latch 70 of accumulator 10. The upper thirty-one sum and thirty-one carry bits generated during the multiplication are respectively coupled to multipelxors 14 and 18. Control circuitry (not shown) controls multiplexors 14 and 18 to allow multiplexor 14 to output sum bits S(62-32) with a single leading zero bit and to allow multiplexor 18 to output carry bits C(62-32) with a single leading zero bit. The sum and carry bits are added by carry save adder 33 with a zero input for the "A" input. Adder 37 completes adding the sum and carry output operands of carry save adder 33 and provides a thirty-two bit accumulated output. The least significant or bottom twenty-two bits are guaranteed to be logic zeroes. Multiplexor 54 provides the product result bits Res(21-0) along with ten logic zero bits. Multiplexor 50 provides the output bits Tot(10-0) and the product result bits Res(31-22). Multiplexor 52 provides the output bits Tot(31-11). During the first cycle, the fourth partial product operand which is illustrated in FIG. 2(C) is formed. During the first machine cycle, carry save adder 31 and adder 35 are not contributing to latch 56 and thus the outputs of multiplexors 12, 16 and 64 and latch 24 are not meaningful.

During a second machine cycle, the first partial product operand illustrated in FIG. 2(C) is formed. The first partial product operand is the result of the multiplication of the lower ordered portion of each double precision operand. The first partial product operand must be properly aligned in accumulator 10 with the fourth partial product operand formed in the first machine cycle. Multiplexor 18 couples output carry bits C(62-32) with a single leading zero bit to the third input "C" of adder 33. Multiplexor 14 couples output sum bits S(62-32) with a single leading zero bit to the second input "B" of adder 33. Multiplexor 22 couples the accumulation input bits Acc(31-0) to the first input "A" of adder 33. The outputs of multiplexors 12 and 16 are logic zero operands. Accumulation input bits Acc(52-32) are coupled to latch 24 and stored. Multiplexors 40 and 46 provide the outputs of latches 38 and 44, respectively, which are coupled to adder 35 via latches 42 and 48, respectively. After adders 33, 37 and adders 31, 35 perform an addition, multiplexors 54, 50 and 52 provide updated outputs to latch 56. Multiplexor 54 provides the completed or total output bits Tot(31-0) from adder 37 to latch 56. Multiplexor 50 provides the completed or total output bits Tot(52-32) from adder 35, and multiplexor 52 provides the completed or total output bits Tot(73-53) which are the accumulation bits Acc(73-53) received from latch 56 and formed during the first machine cycle. The lower thirty-two result bits Res(31-0) are latched into latch 70 and coupled to multiplexor 72 so that all thirty-two bits can be used as sticky information. Result bits Res(31-0) are selected by multiplexor 72 and coupled to OR gate 74 which provides a single sticky bit as the sticky bit information. Since the maximum result precision is double format according to the IEEE P754 standard, the lower thirty-two product result bits, Red(31-0) do not need to be accumulated exactly. The second machine cycle is the only cycle during which sticky bit information is formed.

During a third machine cycle, the second partial product operand illustrated in FIG. 2(C) is formed. The second partial product operand is the result of the multiplication of the lower ordered portion of the first of the double precision operands and the higher ordered portion of the second of the two double precision operands. The second partial product operand must be properly aligned with the first and fourth illustrated and previously formed partial product operands. Multiplexor 18 couples the product result bits Res(31-11) preceded by the carry input bits C(42-32) to the third input "C" of carry save adder 33. Multiplexor 14 couples sum bits S(42-32) and twenty-one forced zeroes to the second "B" input of adder 33. Multiplexor 22 couples the accumulation bits Acc(31-0) received from latch 56 from the second machine cycle. Multiplexor 16 couples the carry input bits C(62-43) to the third input "C" of carry save adder 31. Multiplexor 12 couples sum bits S(62-43) with a single leading zero bit to the second input "B" of carry save adder 31. Accumulation bits Acc(52-32) from the previous machine cycle are coupled to the first input "A" of carry save adder 31. Adders 31 and 35 add the inputs in conjunction with adders 33 and 37. A carry input operand and a carry bit, if any, from the second machine cycle are coupled into adder 35 from adders 33 and 37, respectively. Multiplexor 54 couples the output bits Tot(31-0) provided by adder 37 to latch 56. Multiplexor 50 couples the output bits Tot(52-32) provided by adder 35 to latch 56, and multiplexor 64 couples the output bits Tot(73-53) provided by multiplexor 64 in response to the output carry bit of adder 35.

During a fourth machine cycle, the third partial product operand illustrated in FIG. 2(C) is formed. The third partial product operand is the result of the multiplication of the higher ordered portion of the first double precision operand and the lower ordered portion of the second double precision operand. The third partial product operand should be aligned bitwise with the second partial product operand of FIG. 2(C). Multiplexor 18 couples carry bits C(42-32) and product result bits Res(31-11) to the third input "C" of adder 33. Multiplexor 14 couples sum bits S(42-32) and twenty-one forced logic zeroes to added 33. Multiplexor 22 couples the low order accumulation bits Acc(31-0) from the previous machine cycle to carry save adder 33. Multiplexor 16 couples carry bits C(62-43) with a single leading zero bit to the third input "C" of carry save adder 31. Multiplexor 12 couples sum bits S(62-43) with a single leading zero bit to the second input "B" of carry save adder 31. Latch 24 couples the accumulation bits Acc(52-32) from the previous machine cycle to the first input "A" of adder 31. Also, a carry input operand and a carry bit, if any, generated during the third machine cycle are coupled into adder 35. Adders 31, 35 and adders 33, 37 function concurrently to provide inputs to multiplexors 50, 52 and 54. Multiplexor 54 provides the output bits Tot(31-0) from added 37. Multiplexor 50 provides the output bits Tot(52-32) from adder 35, and multiplexor 52 provides the output bits Tot(73-53) from multiplexor 64 in response to the carry output bit of adder 35.

Figure 3B:
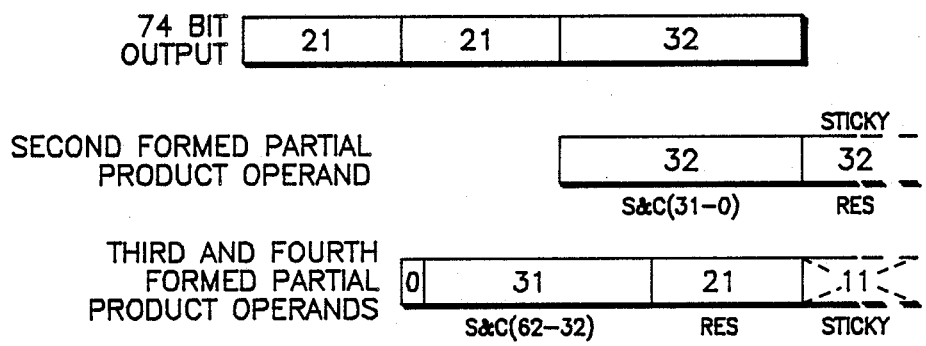

Shown in FIG. 3(B) is a correlation of bit alignments in accumulator 10 for the second, third and fourth formed partial product operands. The partial product operands are illustrated in relation to placement in the seventy-four bit latch 56. As noted in FIG. 3(B), the sticky bits of the second formed partial product operand are not stored in latch 56. The overlap of operand bits which are stored in latch 56 during the formation of the second, third and fourth formed partial product operands may be readily seen. The first formed partial product operand, as subsequently modified by carry inputs, occupies the upper portion of the seventy-four bit latch 56.

After four machine cycles, the four partial product operands of the double precision multiplication have been accumulated. However, in the fourth machine cycle if an output carry bit is created by adder 37, this additional carry bit has not yet been added into the upper forty-two data bits of the accumulated product. Therefore, a fifth machine cycle is required to insure that if a carry output bit is created that the carry bit will be added into the final output operand.

During the fifth machine cycle, the outputs of latches 27, 28 and 29 remain the same as during the fourth machine cycle. Multiplexors 12 and 16 each output a zero value operand, and latch 24 provides bits Acc(52-32) generated during the previous machine cycle. Latch 61 receives the accumulated output bits Acc(73-53) from the fourth machine cycle and incrementer 62 adds a one into this operand value. If a carry output bit is generated by either adder 37 or carry save adder 33 during the fourth machine cycle, adder 35 will have a carry input bit. The carry output bit of adder 37 is added to the Acc(52-32) bit value to determine the carry output bit of adder 35. The carry output bit of adder 35, if asserted, will force multiplexor 64 to select the incremented accumulation value. If no carry output bit is generated during the fifth machine cycle by adder 35, multiplexor 64 outputs the previous accumulation value Acc(73-53) which is coupled back to latch 56 via multiplexor 52. In this manner an accumulated output product of two double precision operands is provided in five machine cycles.

By now it should be apparent that a fast and versatile accumulator circuit has been provided. Accumulator 10 may be adapted for use with integer multiplication as well as floating point multiplication. By accumulating only bits which are actually needed for a predetermined data format and coupling all others into a sticky bit calculation portion, computing time is minimized. In other words, only an exact number of bits which are required to support the stated operand formats are accumulated. Speed paths in the circuitry are efficiently implemented by latching carry bits generated during the calculation of the lower ordered portion of the accumulated output for use during a subsequent machine cycle.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

We claim:

1. A circuit for forming one or more partial product operands resulting from multiplying two input operands and accumulating the one or more partial product operands to provide an output product operand, each input operand having one of either a single or double precision data format, comprising:

a first adder of predetermined bit capacity, for selectively receiving a predetermined plurality of unaccumulated sum and carry bits resulting from the multiplication of the two input operands and selectively receiving previously accumulated interim product bits of a first predetermined portion of an output product operand, said first adder having a first input for selectively receiving the unaccumulated carry bits and a portion of the interim product bits, a second input for selectively receiving the unaccumulated sum bits, and a third input for selectively receiving the first portion of the interim product bits, said first adder providing a sum operand output and a carry operand output;

a second adder having a first input coupled to the sum operand output of the first adder, having a second input coupled to the carry operand output of the first adder, and providing a first portion of the output product operand and a carry bit for use in forming a second portion of the output product operand;

upper product adder means for selectively receiving a predetermined portion of the plurality of unaccumulated sum and carry bits resulting from the multiplication of the two input operands and receiving previously accumulated interim product bits of a second predetermined portion of the output product operand, said upper product adder means adding the received bits to provide an upper predetermined portion of the output product operand;

latch means coupled to the first and second adders and to said upper product adder means for receiving and storing the lower and upper portions of the output product operand; and feedback means coupled between the latch means and the first and second adders and to said upper product adder means, for selectively providing the first and second portions of the output product operand as the interim product bits.

2. A circuit for forming one or more partial product operands resulting from multiplying two input operands and accumulating the one or more partial product operands to provide an output product operand, each input operand having one of either a single or double precision data format, comprising:

a first adder of predetermined bit capacity, for selectively receiving a predetermined plurality of unaccumulated sum and carry bits resulting from the multiplication of the two input operands and selectively receiving previously accumulated interim product bits of a first predetermined portion of an output product operand, said first adder having a first input for selectively receiving the unaccumulated carry bits and a portion of the interim product bits, a second input for selectively receiving the unaccumulated sum bits, and a third input for selectively receiving the first portion of the interim product bits, said first adder providing a sum operand output and a carry operand output;

a second adder having a first input coupled to the sum operand output of the first adder, a second input coupled to the carry operand output of the first adder, and providing a first portion of the output product operand and a carry bit for use in forming a second portion of the output product operand;

a third adder of predetermined bit capacity, a first input of the third adder selectively receiving a portion of the unaccumulated carry bits, a second input of the third adder selectively receiving a portion of the unaccumulated sum bits, and a third input of the third adder selectively receiving the second portion of the interim product bits, said third adder providing a sum operand output and a carry operand output; and a fourth adder having a first input coupled to the sum operand output of the third adder, having a second input coupled to both the carry operand output of the third adder and the carry operand output of the first adder, a carry bit input of the fourth adder being coupled to the carry bit of the second adder, said fourth adder providing a second portion of the output product operand and a second carry bit;

latch means coupled to the first, second, third and fourth adders for receiving and storing the lower and upper portions of the output product operand; and feedback means coupled between the latch means and the first, second, third and fourth adders, for selectively providing the first and second portions of the output product operand as the interim product bits.

3. The circuit of claim 2 further comprising:

incrementer means having an input coupled to the latch means for receiving a third predetermined portion of the output product operand, a control input coupled to the second carry bit of the fourth adder, and an output coupled to the latch means, said incrementer means incrementing the third predetermined portion of the output product operand in response to the second carry bit.

4. A method for using a circuit having first, second and third adders to form one or more partial product operands resulting from two input operands being multiplied and accumulating the one or more partial product operands to provide an output product operand wherein each input operand has one of either a single or a double precision data format, comprising the steps of:

selectively receiving with the first and second adders unaccumulated sum and carry bits resulting from the multiplication of the two input operands and receiving final product bits of first and second predetermined portions, respectively, of the output product operand from the multiplier;

dividing the received bits into an upper and a lower portion for respective processing by the second and first adders;

selectively adding groups of the received bits in the lower and upper portions a predetermined integer number of iterations, including one, said predetermined number determined by the data formats of the input operands, to provide final or interim output product bits;

latching carry output data, if any, from the lower portion for use in subsequent iterations, if any, by a third adder in the upper portion, said third adder being coupled to the second adder; and outputting the output product operand after the predetermined integer number of iterations.

5. The method of claim 4 wherein the predetermined number of iterations is one when each input operand is a single precision data operand.

6. The method of claim 4 wherein the predetermined number of iterations is three when a first of the input operands is a single precision data operand and a second of the input operands is a double precision data operand.

7. The method of claim 4 wherein the predetermined number of iterations is five when each of the input operands is a double precision data operand.

* * * * *